United States Patent

Brand

(10) Patent No.: US 9,016,138 B2
(45) Date of Patent: Apr. 28, 2015

(54) FLANGED REDUCER VORTEX FLOWMETER

(71) Applicant: Rosemount Inc., Chanhassen, MN (US)

(72) Inventor: Christopher Jon Brand, Golden Valley, MN (US)

(73) Assignee: Rosemount Inc., Shakopee, MN (US)

( * ) Notice: Subject to any disclaimer, the term of this patent is extended or adjusted under 35 U.S.C. 154(b) by 164 days.

(21) Appl. No.: 13/800,775

(22) Filed: Mar. 13, 2013

(65) Prior Publication Data

US 2014/0260666 A1 Sep. 18, 2014

(51) Int. Cl.
*G01F 1/32* (2006.01)

(52) U.S. Cl.
CPC ............... *G01F 1/3218* (2013.01); *G01F 1/32* (2013.01)

(58) Field of Classification Search
USPC ........................................ 73/861.22, 861.24
See application file for complete search history.

(56) References Cited

U.S. PATENT DOCUMENTS

| | | | |
|---|---|---|---|
| 4,464,939 A * | 8/1984 | Corpron | 73/861.24 |
| 4,627,295 A * | 12/1986 | Matsubara et al. | 73/861.24 |
| 4,718,283 A * | 1/1988 | Kamentser | 73/861.22 |
| 6,053,053 A | 4/2000 | Huotari | |
| 7,082,840 B2 * | 8/2006 | Bengtson | 73/861.22 |
| 7,603,914 B2 | 10/2009 | Hoecker | |
| 2007/0163361 A1 | 7/2007 | Lewicke | |

FOREIGN PATENT DOCUMENTS

| | | |
|---|---|---|
| CN | 101910805 B | 12/2010 |
| JP | 2005227115 A | 8/2005 |

OTHER PUBLICATIONS

Rosemount, Rosemount 8800D Series Vortex Flowmeter, Product Data Sheet, 00813-0100-4004, Rev HA, Apr. 2010, 50 pages.
International Search Report and Written Opinion from PCT Application Serial No. PCT/US2014/025352, dated Jul. 2, 2014, 12 pages.

* cited by examiner

*Primary Examiner* — Jewel V Thompson
(74) *Attorney, Agent, or Firm* — Kinney & Lange, P.A.

(57) ABSTRACT

A flanged vortex flowmeter is connected to a flanged piping system that has a diameter larger than the diameter of the measurement section of the vortex flowmeter border. The vortex flowmeter has an inlet flange that reduces diameter from the inlet to the measurement section. A bluff body positioned in the measurement section produces vortices that alternate at a frequency proportional to the flow rate of fluid through the flowmeter. A length from inception of vortex shedding at the bluff body to a first expansion of the flow passage downstream of the bluff body is greater than a vortex wavelength of the vortices produced by the bluff body.

21 Claims, 7 Drawing Sheets

FLANGED REDUCER VORTEX FLOWMETER

BACKGROUND

This invention relates to flanged reducer vortex flowmeters. In particular, this invention relates to connecting a vortex flowmeter to a flanged piping system that has a diameter that is larger than the diameter of the bore of the measurement section of the vortex flowmeter.

Vortex flowmeters are used in the industrial process measurement and control field for measuring a flow rate of a fluid. Vortex flowmeters are typically inserted in a flow pipe that carries the fluid to be measured. Industry applications include petroleum, chemical, pulp and paper, mining and materials, oil and gas. The operating principle of a vortex flowmeter is based on a vortex shedding phenomenon known as the von Karman effect. As fluid passes a bluff body, it separates and generates vortices that are shed alternately along and behind each side of the bluff body. These vortices cause areas of fluctuating pressure that are detected by a sensor mounted in the bluff body or downstream of the bluff body. While the frequency of vortex generation is essentially proportional to fluid velocity, this proportionality varies with the conduit Reynolds number. The conduit Reynolds number is a function of the fluid density, the fluid velocity, the fluid losses, and the inside diameter of the conduit.

In piping systems, there is a desire to keep the Reynolds number low in order to reduce power loss in the piping system. This desire to reduce power loss leads to use of larger pipe sizes and lower ranges of fluid flow velocity in the piping system.

In vortex flowmeters, there are limits to the range of flows that are measurable. When flow velocities are below a lower limit of measurable flow, the vortex flowmeter cannot be relied upon to provide an accurate indication of flow.

For these reasons, reducer vortex flowmeters have been developed in which the flowmeter is connected by flanges to a flanged piping system. The diameter of the measurement section of the bore of the flowmeter is smaller than the inner diameter of the pipe section to which the flowmeter is connected. At the upstream or inlet end, the flow passage is reduced or constricted from the piping system diameter to the bore diameter of the flowmeter. At the downstream, or outlet end the diameter of the passage must increase to match the diameter of the piping system downstream of the flowmeter. This is often achieved with a tapering reducer section at the upstream end and a tapering expander section at the downstream end of the vortex flowmeter.

SUMMARY

A vortex flowmeter assembly includes a flowmeter body having a flow passage that extends between an upstream and a downstream end. The flowmeter flow passage preferably has a measurement section with a diameter of greater than 6 inches. A reducer section is located between the upstream and of the flowmeter body and the measurement section. In the reducer section, the diameter is reduced from the larger diameter of the piping system to the diameter of the measurement section. A bluff body is positioned in the measurement section to produce vortices that alternate at a frequency related to the flow rate of fluid through the flow passage. The length of the measurement section from a location at the inception of vortex shedding at the bluff body to a first expansion in diameter of the flow passage downstream of the bluff body is greater than a wavelength of the vortices produced by the bluff body.

DETAILED DESCRIPTION

Figure 1:
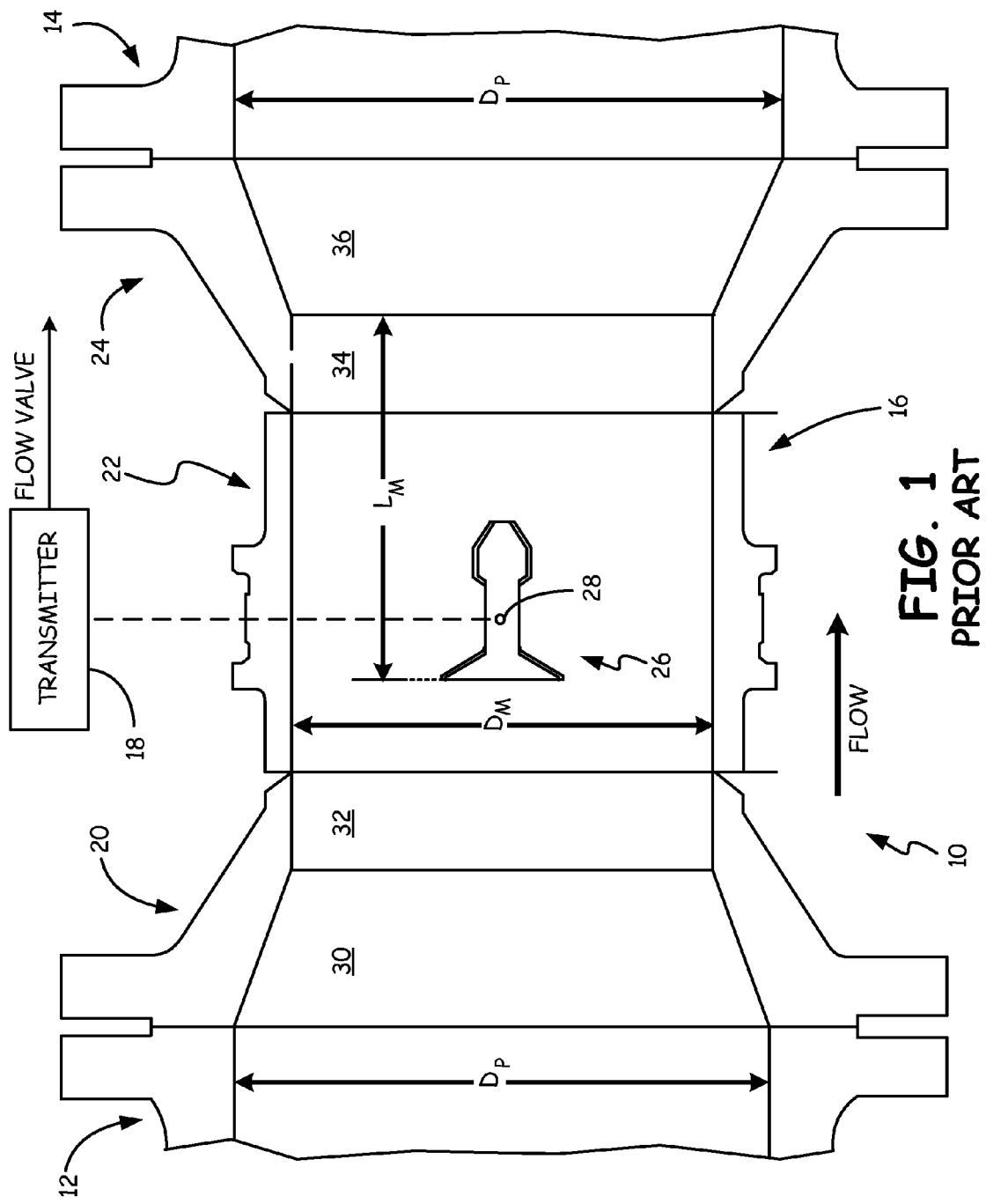
FIG. 1 is a cross-sectional view of the prior art reducer vortex flowmeter.

FIG. 1 shows prior art reducer vortex flowmeter 10 mounted between pipeline sections 12 and 14. Flowmeter 10 includes flow tube 16 and transmitter 18. Flow tube 16 is formed by upstream flange reducer 20, measurement section 22, and downstream flange expander 24. Bluff body 26 and sensor 28 are located within measurement section 22 of flow tube 16. Pipeline sections 12 and 14 have an inner diameter $D_P$ that is larger than the bore diameter of $D_M$ of measurement section 22.

Flange reducer 20 is attached to pipe section 22 by fasteners, such as bolts and nuts (not shown). Flange reducer 20 includes tapered bore section 30, which reduces in diameter from pipe diameter $D_P$ to measurement bore diameter $D_M$. Constant diameter section 32 has diameter $D_M$ to match measurement section 22.

Flange expander 24 is located between measurement section 22 and pipe section 14. Flange expander 24 includes constant diameter section 34 located downstream of measurement section 22 and expander section 36, which is tapered to increase from diameter $D_M$ of section 34 to diameter $D_P$ of pipe 14. Flange expander 24 is mounted to pipe 14 by connectors such as bolts and nuts (not shown).

In FIG. 1, process fluid flows from pipe 12 through flange reducer 20 into measurement section 22. As the process fluid passes through flange reducer 20, the diameter of the flow passage reduces from $D_P$ to $D_M$, and the fluid slowly increases in velocity.

When the process fluid encounters bluff body 26, Karman effect vortex shedding occurs. The process fluid separates and vortices that are shed alternately along and behind each side of bluff body 26. These vortices cause areas of fluctuating pressure that are detected by sensor 28. Transmitter 18 receives the sensor signal from sensor 28 and produces a flow measurement value based upon the frequency of the vortex generation. The output of transmitter 18 is a flow value that is transmitted in either analog or digital form. For example, the flow value may be represented by an analog current over a two wire loop that ranges from 4 to 20 mA. Alternatively, the flow value may be transmitted in a digital form over a two wire loop using the HART digital protocol, over a communication bus using a digital protocol such as Foundation fieldbus, or by wireless transmission using a wireless protocol such as WirelessHART (IEC 62591).

In FIG. 1, sensor 28 is shown as being mounted in bluff body 26. In other embodiments, sensor 28 may be positioned separate from bluff body 26 at a location or locations downstream of the front face of bluff body 26.

Flow of the process fluid continues from measurement section 22 into flange expander 24. Diameter $D_M$ does not change within flange expander 24 until process fluid reaches expander section 36. At that point, the inner diameter of expander 36 increases until flange expander 24 meets pipe 14. Expander section 36 provides a smooth transition in diameter from $D_M$ to $D_P$.

As shown in FIG. 1, length $L_M$ is a distance from the front face of bluff body 26 (where fluid first encounters bluff body 26) to expander section 36 (where the diameter first begins to expand from measurement section diameter $D_M$ to pipe diameter $D_P$).

Vortex flowmeters are designed for installation in flanged piping systems that include different pressure ranges and a range of sizes in standardized steps of nominal pipe diameters. These steps typically include ½ inch (15 mm), 1 inch (25 mm), 1½ inch (40 mm), 2 inch (50 mm), 3 inch (80 mm), 4 inch (100 mm), 6 inch (150 mm), 8 inch (200 mm), 10 inch (250 mm), and 12 inch (300 mm). A reducer vortex flowmeter like flowmeter 10 typically has a measurement bore diameter $D_M$ that is under sized by one pipe size step from the pipeline diameter $D_P$ of the process piping system in which it is installed.

It has been discovered that certain reducer vortex flowmeters can exhibit less accuracy and less stable signals then their standard "straight through" counterpart (which do not include a reducer and expander). The reduced accuracy and less stable signals tend to be exhibited by the larger diameter reducer vortex flowmeters, where the overall length of the reducer flow meter, and particularly the length $L_M$ from the front face of the bluff body to the first expansion is shorter relative to measurement bore diameter $D_M$.

Figure 2:
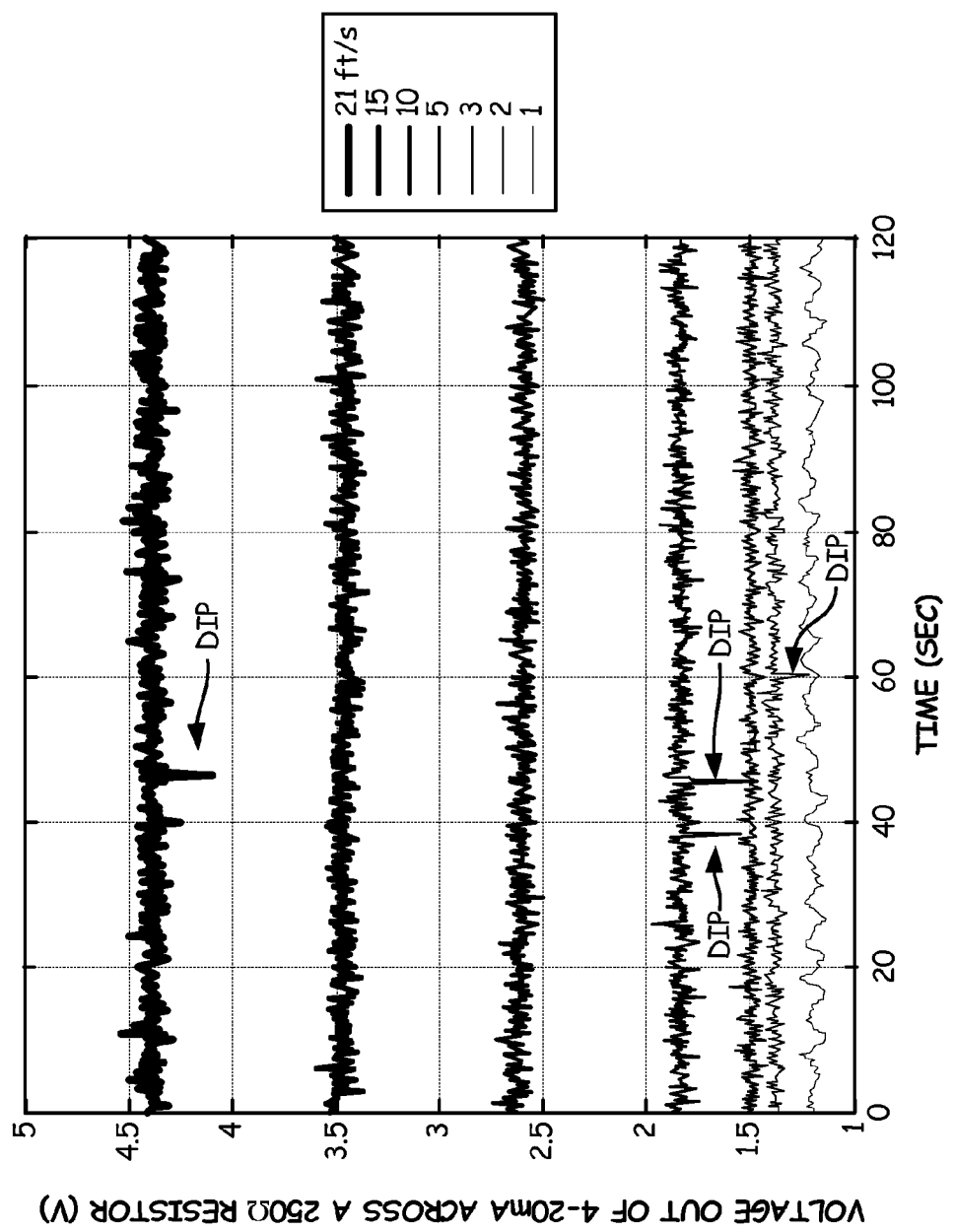
FIG. 2 is a graph showing analog 4-20 mA flow data from an 8 inch reducer vortex flowmeter of the configuration shown in FIG. 1.

Test results show that an expansion downstream of bluff body 26 can adversely affect repeatability of the vortex shedding signal. FIG. 2 shows an analog 4-20 mA signal representing the measured flow value versus time from an 8 inch reducer vortex flowmeter (i.e., $D_P$=8 inches, $D_M$=6 inches) having the configuration shown in FIG. 1. Signals are shown for flow rates ranging from 1 ft/s up to 21 ft/s. FIG. 2 shows sporadic dips in the 4-20 mA signal.

Figure 3:
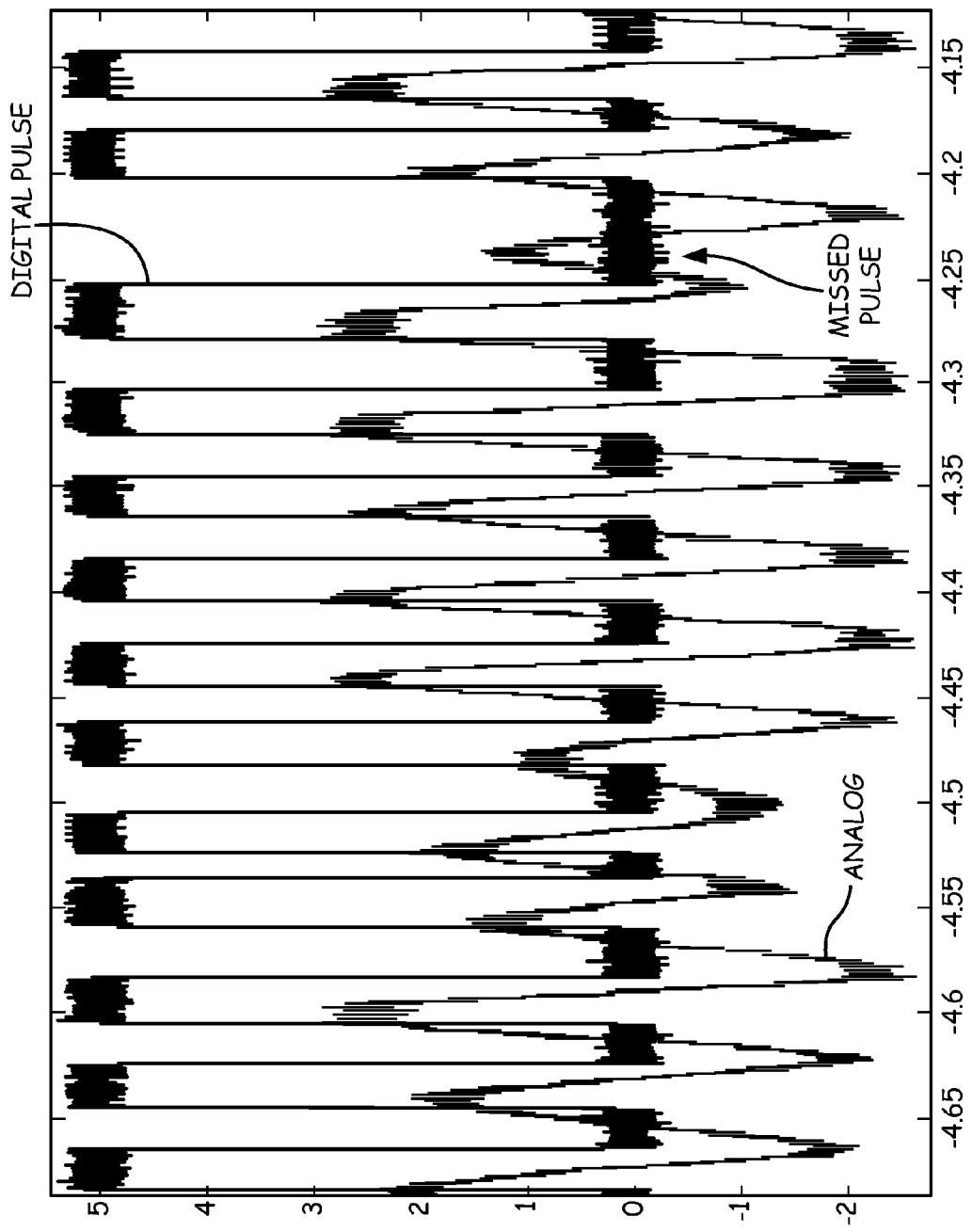
FIG. 3 is a graph of oscilloscope data from an 8 inch standard reducer vortex flowmeter of the configuration shown in FIG. 1.

FIG. 3 shows oscilloscope data from the same 8 inch reducer vortex flowmeter used to produce the graphs of FIG. 2. FIG. 3 shows both an analog signal from the sensor, and a digital pulse generated based on the analog signal. The oscilloscope data shows that instability of the vortex shedding signal can cause missed pulses, which results in fluctuations in the flow value measured.

Expansions in diameter that are too abrupt for the fluid to follow will cause boundary layer separation and transient pressure gradients. These pressure gradients can negatively affect the upstream dynamic vortex shedding within a vortex flowmeter.

Figure 4:
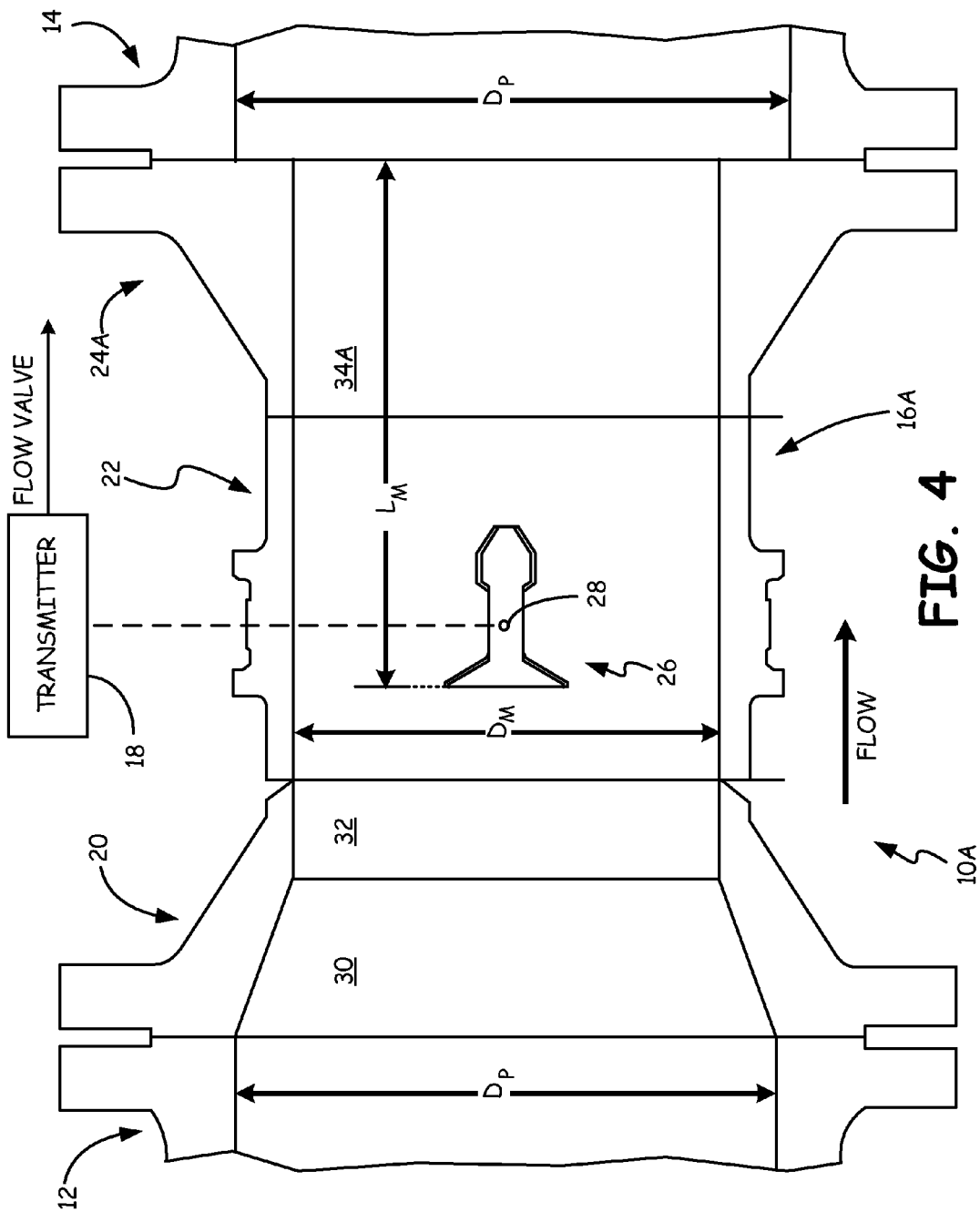
FIG. 4 is a cross-sectional view of a reducer vortex flowmeter of the present invention.

FIG. 4 shows reducer vortex flowmeter 10A, which is an embodiment of the present invention. Reducer vortex flowmeter 10A is similar to prior art flowmeter 10 of FIG. 1, and similar reference numbers are used to identify similar parts. Flow tube 16A of FIG. 4 differs from flow tube 16 shown in FIG. 1 by the use of straight flange 24A. As shown in FIG. 4, flange 24A contains only constant diameter section 34A that extends from measurement section 22 all the way to pipe 14. Bore diameter $D_F$ is constant over entire length $L_M$ from the forward edge of bluff body 26 to the first expansion which occurs at the interface between flange 24A and pipe 14.

The present invention is based upon the discovery that length $L_M$ could be related to the wavelength of the vortex produced by bluff body 26. The wavelength $\lambda$ of the vortex is constant for all velocities within the calibration range of flowmeter 10A. If distance $L_M$ from the inception of vortex shedding at the front face of bluff body 26 to the first expansion in diameter downstream of bluff body 26 equals or exceeds the vortex wavelength, then each vortex should properly develop. If $L_M$ is less than $\lambda$, then instability in the vortices can occur.

With prior art reducer flowmeter 10, instability can occur when $D_M$ is 6 inches or larger because the ratio of $L_M$ to $\lambda$ is less than 1. In other words, for $D_M$ of 6 inch or larger, $L_M$ of prior art reducer vortex flowmeter 10 is less than the vortex wavelength $\lambda$ of the vortices that are produced by bluff body 26.

To determine the value of $L_M$ required for reducer vortex flowmeter 10A, vortex wavelength $\lambda$ must be determined. The following equations show how $\lambda$ can be determined for a particular vortex shedding flowmeter.

$$\lambda = v/f \qquad \text{Eq. 1}$$

where $\lambda$ equals vortex wavelength, v equals flow velocity, and f equals vortex frequency.

$$K = \frac{pul}{Vol} \qquad \text{Eq. 2}$$

where K is the K factor characteristic of a vortex flowmeter in pulse (pul) per unit volume (vol).

$$f = \frac{pul}{t} \qquad \text{Eq. 3}$$

where t equals time.

$$v = \frac{Vol/t}{A} \qquad \text{Eq. 4}$$

where A equals cross-sectional area.

$$\lambda = \left[\frac{\frac{Vol/t}{A}}{pul/t}\right] \qquad \text{Eq. 5}$$

$$\lambda = \left[\frac{Vol}{pul}\right] \cdot \left[\frac{1}{A}\right] \qquad \text{Eq. 6}$$

$$\lambda = \left[\frac{1}{K \cdot A}\right] \qquad \text{Eq. 7}$$

As shown in Eq. 7, the vortex wavelength can be determined if the K factor and the cross-sectional area of metering section 22 is known. Each vortex shedding flowmeter has a K factor that is typically determined by calibration at the factory. For purposes of the following calculations, nominal K factor values for vortex shedding flowmeters of different sizes have been used. Table 1 shows wavelength $\lambda$ in inches for different reducer flowmeters. The pipeline diameters $D_P$ range from 1 inch to 12 inches, and the corresponding flowmeter bore diameters $D_M$ range from 0.5 inch to 10 inches, respectively.

TABLE 1

| $D_M$ (inches) | $D_P$ (inches) | Nominal K Factor (pul/cu. ft) | Area (sq. ft) | Wavelength λ (inches) |
|---|---|---|---|---|
| 0.5 | 1 | 12119.162 | 0.001596 | 0.620 |
| 1 | 1.5 | 2175.091 | 0.004891 | 1.128 |
| 1.5 | 2 | 576.556 | 0.012028 | 1.730 |
| 2 | 3 | 264.289 | 0.020127 | 2.256 |
| 3 | 4 | 78.951 | 0.044957 | 3.381 |
| 4 | 6 | 34.806 | 0.078261 | 4.405 |
| 6 | 8 | 10.220 | 0.177392 | 6.619 |
| 8 | 10 | 4.411 | 0.310818 | 8.753 |
| 10 | 12 | 2.169 | 0.498892 | 11.087 |

Based upon the wavelengths shown in Table 1, the prior art reducer vortex flowmeter 10 has a value of $L_M$ that is greater than the vortex wavelength for $D_M$ up to 4 inches. However, for prior art reducer flowmeters of FIG. 1 having a measurement bore diameter $D_M$ of 6 inches or larger, vortex wavelength λ exceeds length $L_M$.

Figure 5:
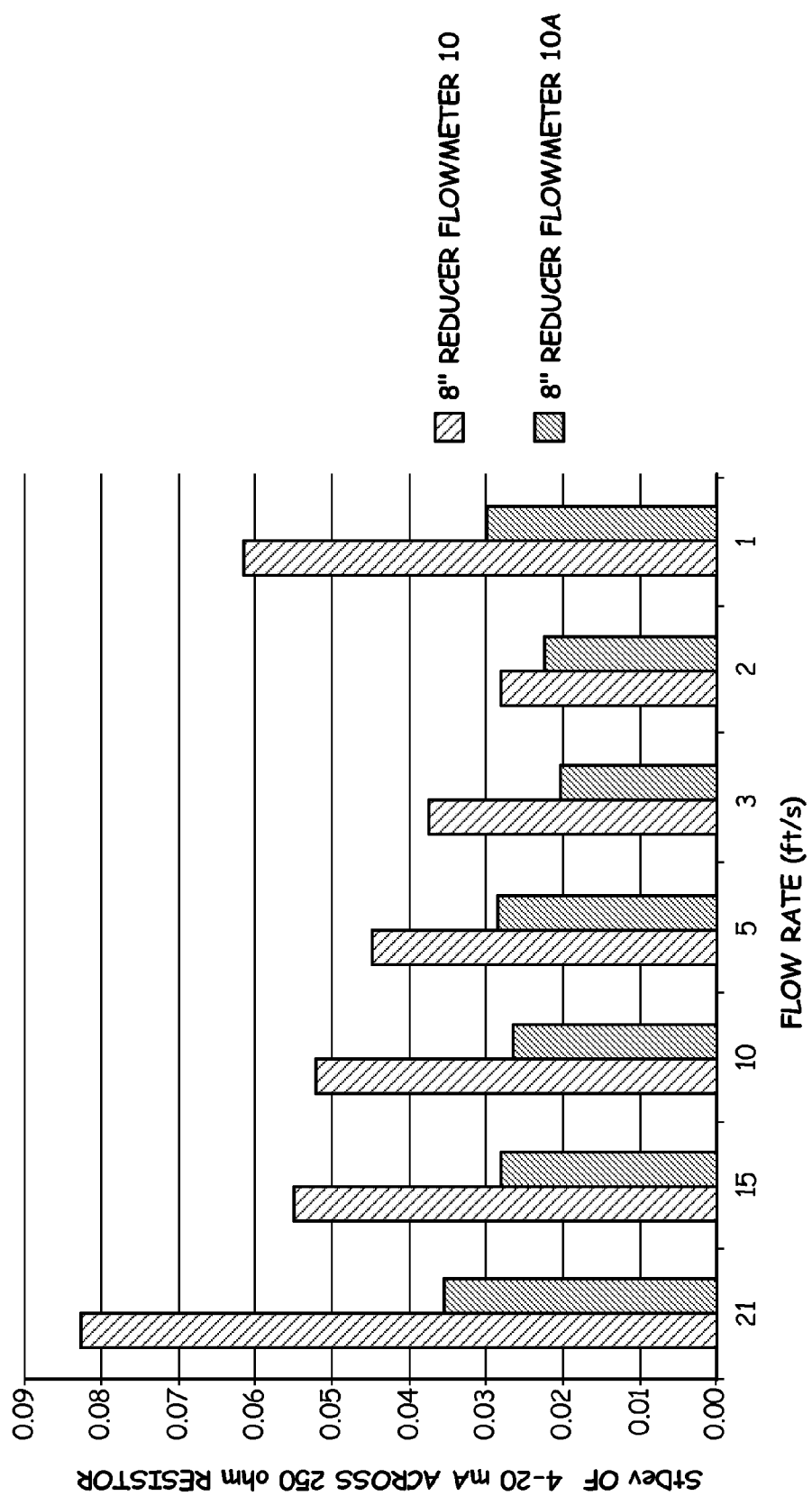
FIG. 5 is a graph comparing standard deviation of the flow signals produced by 8 inch reducer vortex flowmeters of the configurations shown in FIG. 1 and FIG. 4.

FIG. 5 shows a graph comparing standard deviation of a 4-20 mA signal produced by an 8 inch reducer vortex flowmeter of the prior art design of flowmeter 10 shown in FIG. 1, and an 8 inch reducer vortex flowmeter having the configuration of flowmeter 10A in FIG. 4. For each of the flow rates from 21 ft/s down to 1 ft/s, standard deviation of the signals produced by each flowmeter are shown. FIG. 5 shows that the standard deviation in the signal produced by flowmeter 10A was consistently less than the standard deviation in the signal produced by the prior art flowmeter 10. The vortex shedding signal produced by flowmeter 10A was up to 50 percent less noisy than flowmeter 10A.

Figure 6:
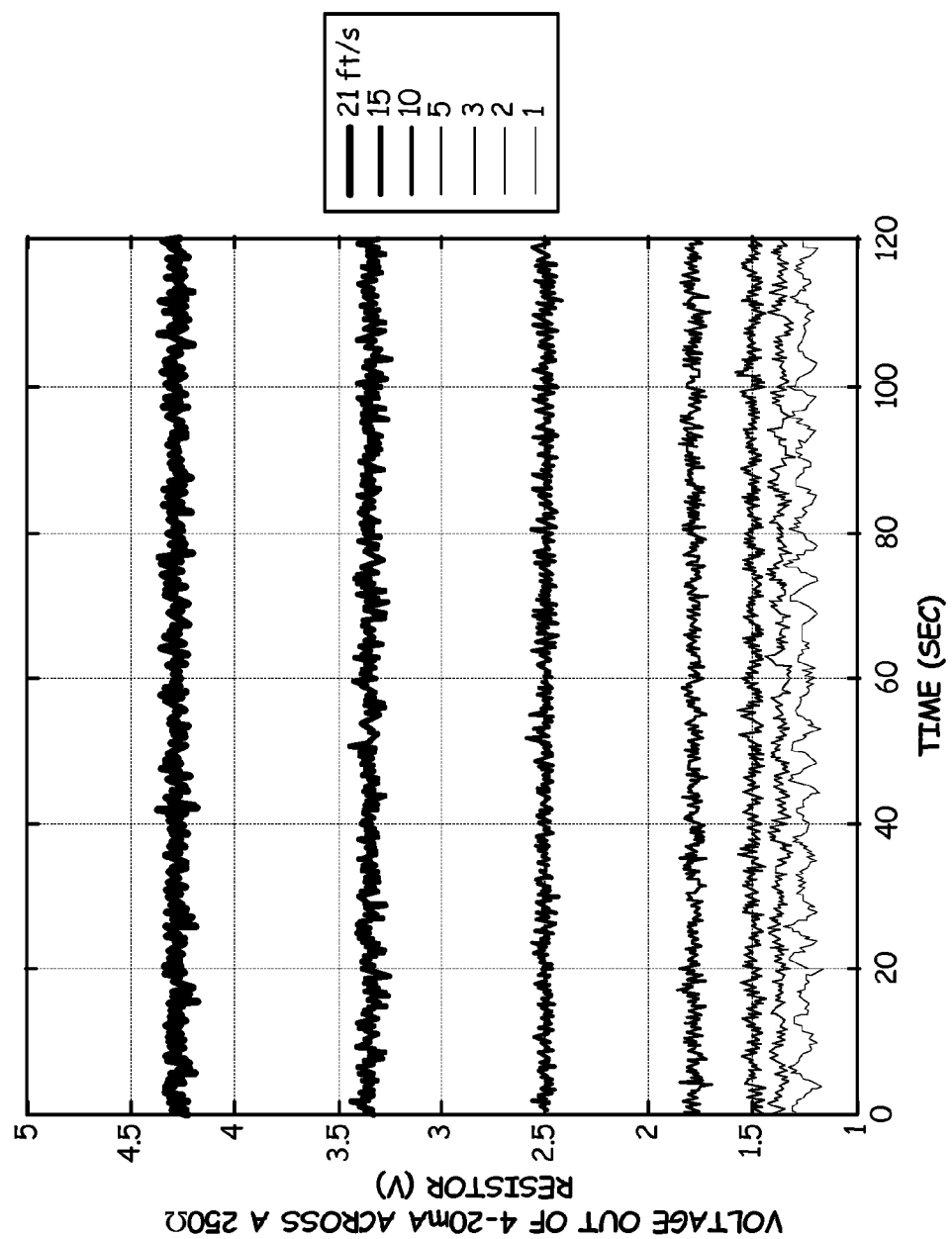
FIG. 6 is a graph showing analog 4-20 mA flow data from an 8 inch reducer vortex flowmeter of the configuration of FIG. 4.

FIG. 6 shows the 4-20 mA output verses time for reducer vortex flowmeter 10A of FIG. 4. A comparison of FIG. 6 to FIG. 2 shows that the dips present in the signals shown in FIG. 2 are not shown in the signals shown in FIG. 6.

Figure 7:
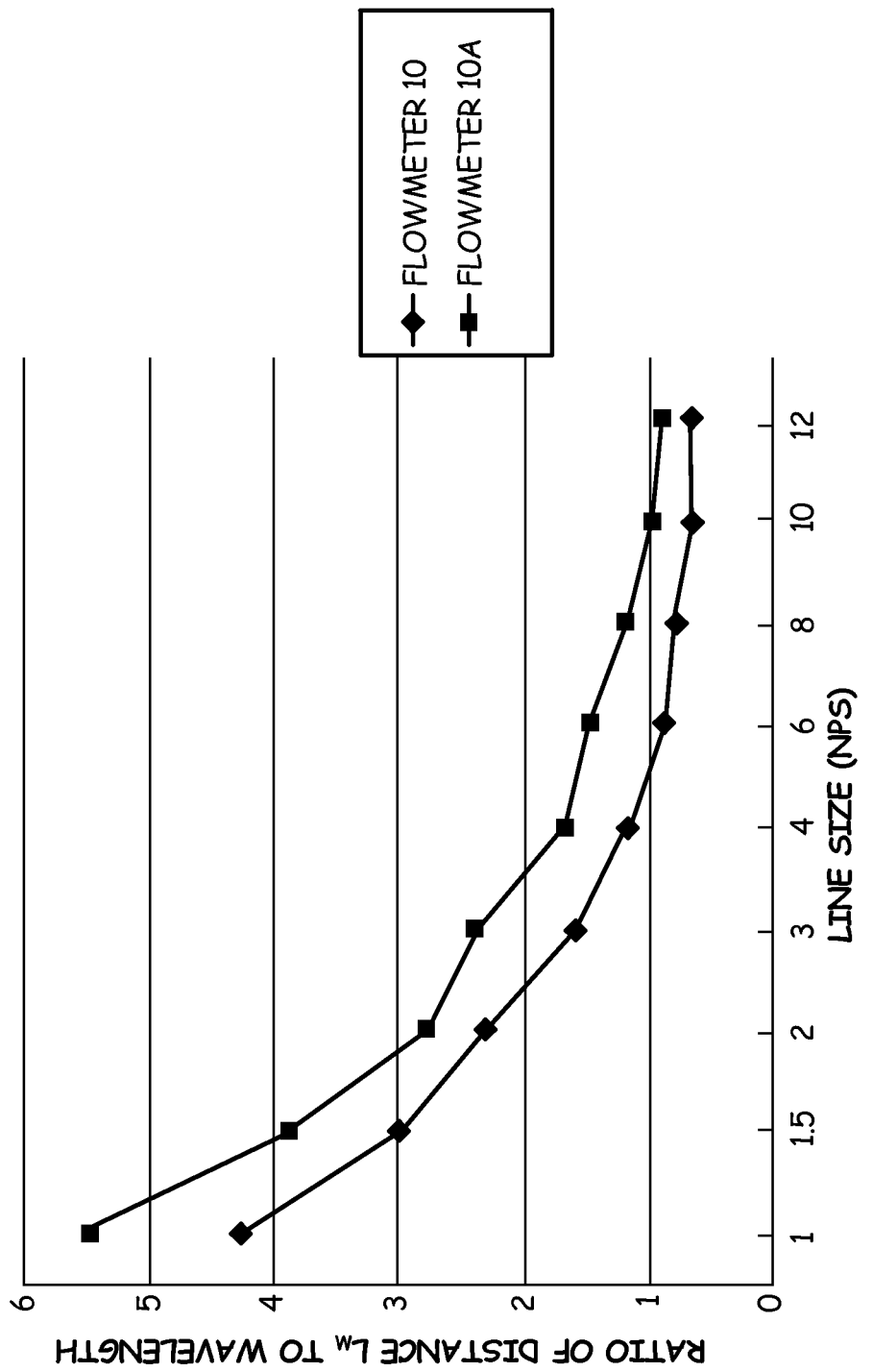
FIG. 7 is a graph of the ratio of distance $L_M$ to wavelength $\lambda$ for different line sizes of the reducer vortex flowmeters of FIGS. 1 and 4.

FIG. 7 is a chart showing the ratio of distance $L_M$ to vortex wavelength λ for flowmeter 10 and flowmeter 10A with different pipeline sizes $D_P$ ranging from 1 inch to 12 inch nominal pipe size. As shown in FIG. 7, the prior art flowmeter 10 has a ratio greater than 1 only up to a pipeline diameter $D_P$ of 6 inches (and $D_M$ of 4 inches). The reducer flowmeters used with pipeline diameters $D_P$ of 8 inches or greater (and $D_M$ of 6 inches or greater) all have a ratio of $L_M$ to λ of less than 1, and therefore have the potential for instability of the vortex shedding that can cause missed pulses.

In contrast, flowmeter 10A in the present invention has a ratio of $L_M$ to λ that is greater than or equal to 1 all the way to pipeline diameter of 10 inches. Enhanced stability at the 10 and 12 inch (and higher) pipe sizes can be achieved with flowmeter 10A by a small increase in $L_M$. This can be achieved by increasing the length of flange 24A by about 0.25 inch for the 10 inch pipeline diameter and about 2 inches for the 12 inch pipeline diameter.

Although section 34A shown in FIG. 4 has been shown as a constant diameter section, the diameter of section 34A can have a very slight taper without presenting an expansion in diameter that is too abrupt for the fluid to follow. In other words, the diameter of section 34A is substantially constant out to $L_M$ greater than λ At the inlet end of flowmeter 10A, reducer section 30 is shown as having a straight taper between pipe 12 and constant diameter section 32. Other profiles that provide a smooth transition from pipe diameter $D_P$ to measurement diameter $D_M$ could be employed in flange reducer 30.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A vortex flowmeter comprising:
    a flow tube body having a flow passage extending between an upstream end and a downstream end, the flow passage having a measurement section of a diameter $D_M$ and a reducer section between the upstream end and the measurement section in which the diameter reduces from a larger diameter $D_P$ at the upstream end to the diameter $D_M$ of the measurement section; and
    a bluff body positioned in the measurement section to produce vortices that alternate at a frequency related to flow rate of fluid through the flow passage;
    wherein a length $L_M$ from a location of inception of vortex shedding at the bluff body to a first expansion in diameter of the flow passage downstream of the bluff body is greater than a vortex wavelength λ of the vortices produced by the bluff body.

2. The vortex flowmeter of claim 1, wherein $D_M$ is 6 inches or greater.

3. The vortex flowmeter of claim 1, wherein $D_M$ is 6 inches and $D_P$ is 8 inches.

4. The vortex flowmeter of claim 1, wherein the length $L_M$ is greater than about 6.6 inches.

5. The vortex flowmeter of claim 1, wherein $D_M$ is 8 inches and $D_P$ is 10 inches.

6. The vortex flowmeter of claim 5, wherein the length $L_M$ is greater than about 8.7 inches.

7. The vortex flowmeter of claim 1, wherein $D_M$ is 10 inches and $D_P$ is 12 inches.

8. The vortex flowmeter of claim 7, wherein $L_M$ is greater than about 11 inches.

9. The vortex flowmeter of claim 1, wherein length $L_M$ and vortex wavelength λ are greater than diameter $D_M$.

10. The vortex flowmeter of claim 1, wherein the flow tube has pipe connection flanges at the upstream and downstream ends.

11. The vortex flowmeter of claim 10 wherein the diameter $D_M$ is substantially constant from the bluff body to the downstream end of the flow tube body.

12. A vortex flowmeter comprising:
    a flow tube body having an upstream end and a downstream end, and a flow passage that reduces in diameter from a pipe diameter $D_P$ at the upstream end to a measurement bore diameter $D_M$ of 6 inches or greater; and
    a bluff body positioned in the flow passage section to produce vortices that alternate at a frequency related to flow rate of fluid through the flow passage;
    wherein the flow passage has a substantially constant diameter of $D_M$ for a length $L_M$ beginning at an upstream end of the bluff body that is greater than a vortex wavelength λ of the vortices produced by the bluff body.

13. The vortex flowmeter of claim 12, wherein $D_M$ is 6 inches and $D_P$ is 8 inches.

14. The vortex flowmeter of claim 12, wherein the length $L_M$ is greater than about 6.6 inches.

15. The vortex flowmeter of claim 12, wherein $D_M$ is 8 inches and $D_P$ is 10 inches.

16. The vortex flowmeter of claim 15, wherein the length $L_M$ is greater than about 8.7 inches.

17. The vortex flowmeter of claim 12, wherein $D_M$ is 10 inches and $D_P$ is 12 inches.

18. The vortex flowmeter of claim 17, wherein $L_M$ is greater than about 11 inches.

19. The vortex flowmeter of claim 12, wherein length $L_M$ and vortex wavelength $\lambda$ are greater than diameter $D_M$.

20. The vortex flowmeter of claim 12, wherein the flow tube has pipe connection flanges at the upstream and downstream ends.

21. The vortex flowmeter of claim 20 wherein the diameter $D_M$ is substantially constant from the bluff body to the downstream end of the flow tube body.

* * * * *